United States Patent [19]
Greenwood et al.

[11] B 3,925,025
[45] Dec. 9, 1975

[54] RING-FLANGED SLIP-JOINT FOR A REACTOR SYSTEM

[75] Inventors: Arthur R. Greenwood, Niles; Walter W. Heinze, Chicago; Edward Schnitta, Bensenville; Frank H. Andrejasich, Summit, all of Ill.

[73] Assignee: Universal Oil Products Company, Des Plaines, Ill.

[22] Filed: Apr. 20, 1973

[21] Appl. No.: 356,253

[44] Published under the Trial Voluntary Protest Program on January 28, 1975 as document no. B 356,253.

[52] U.S. Cl............ 23/288 G; 23/288 R; 208/165; 208/169
[51] Int. Cl.² ......................................... B01J 8/12
[58] Field of Search .......... 23/288 R, 288 G, 288 B, 23/288 C, 289; 208/165, 169, 173, 174

[56] References Cited
UNITED STATES PATENTS

| | | | |
|---|---|---|---|
| 2,108,087 | 2/1938 | Thayer | 23/288 R |
| 2,363,623 | 11/1944 | Roach et al. | 23/288 R |
| 3,051,561 | 8/1962 | Grimes | 23/288 R |
| 3,706,536 | 12/1972 | Greenwood et al. | 23/288 G |

Primary Examiner—Joseph Scovronek
Attorney, Agent, or Firm—James R. Hoatson, Jr.; Robert W. Erickson; William H. Page, II

[57] ABSTRACT

A ring-flanged slip-joint including a flexible ribbon seal for utilization in movably connecting a catalyst-retaining screen with a screen support member, both of which are disposed within a catalytic reaction chamber. The resulting reactor system affords lateral, radial flow of a reactant stream through a catalyst zone while simultaneously preventing the migration of catalyst particles into the outer reactant conduit.

3 Claims, 5 Drawing Figures

3,925,025

RING-FLANGED SLIP-JOINT FOR A REACTOR SYSTEM

APPLICABILITY OF INVENTION

The ring-flanged slip-joint of the present invention is intended for utilization in a reaction chamber wherein the catalytic conversion of a reactant stream is effected. More particularly, our inventive concept encompasses a reactor system which provides radial-flow contact of a reactant stream with catalyst particles, which are movable through the system via gravity-flow, and is specifically directed toward the vapor-phase conversion of hydrocarbon streams. The present invention may be advantageously applied with respect to (i) single-stage reaction systems, (ii) multiple-stage processes wherein the reactant stream flows serially through two or more reaction chambers situated side-by-side and, (iii) a multiple-stage, stacked reactor system, and combinations thereof.

The improved reactor apparatus, herein described, provides for the retention of catalyst particles disposed within an annular-form section through which the reactant stream flows laterally and radially to afford the most advantageous, technically-sound contact between the reactant stream and the catalyst particles. Tubular-form sections, of varying nominal internal cross-sectional areas, are vertically and coaxially disposed to form the reactor system. Briefly, the system comprises a reaction chamber containing a coaxially disposed catalyst-retaining screen, having a nominal internal cross-sectional area less than said chamber, and a perforated centerpipe having a nominal, internal cross-sectional area less than the catalyst-retaining screen. The reactant stream is introduced, preferably in vapor phase, into the annular-form space created between the inside wall of the reaction chamber and the outside of the catalyst-retaining screen. The latter forms an annular-form catalyst-holding zone with the outside surface of the perforated centerpipe; vaporous reactant flows laterally and radially through the screen and catalyst zone into the centerpipe and out of the reaction chamber. Judicious design and operating considerations obviously require that the openings both in the centerpipe and the catalyst-retaining screen be sized to restrict the passage of catalyst particles therethrough. Furthermore, although the tubular-form configuration of the various components may take any suitable shape — i.e. triangular, square, oblong, diamond, etc. — many design, fabrication and technical operating considerations indicate the advantages of utilizing components which are substantially circular in cross-section.

Candor compels recognition of the fact that various types of conversion processes utilize multiple-stage reactor systems, either in side-by-side configuration, or as a vertically-disposed stack. Such systems, as applied in petroleum refining technology, have been employed in a wide variety of hydrocarbn conversion reactions, including catalytic reforming, fixed-bed alkylation, hydrorefining, hydrocracking, dehydrogenation, hydrogenation, steam reforming, etc. Many of these processes, such as dehydrogenation, desulfurization, etc., have traditionally employed a single fixed-bed reaction system. In the interest of brevity, and not with the intent of specifically limiting our invention beyond the scope and spirit of the appended claims, the following discussion will be primarily directed toward the catalytic reforming of naphtha fractions. It is understood, however, that the reactor system stemming from our inventive concept affords a distinct improvement in other hydrocarbon conversion processes. It is further understood that the ring-flanged slip-joint of our invention offers advantages both with respect to the common fixed-bed system and the recently developed system having catalyst particles movable therethrough via gravity-flow.

Historically the catalytic reforming process, utilizing a catalytic composite of a Group VIII noble metal component combined with a refractory inorganic oxide, was effected in a non-regenerative, fixed-bed system consisting of a plurality of reaction zones in side-by-side relation. When the catalytic composite had become deactivated to the extent that continued operation was not economically feasible, the system was shut down, and the catalyst regenerated in situ. After several such regenerations, the catalyst was replaced and the deactivated catalyst subjected either to an exotic reconditioning technique, or to an involved method for recovering the precious noble metal. Of more recent vintage is the so-called "swing-bed" system in which an extra reactor is substituted for one which is due to be placed off-stream for regeneration purposes. This swing-bed system gained wide acceptance, notwithstanding the required increase in catalyst inventory, in view of the fact that the entire unit was not caused to be shut down except for major operational upsets, or periodic turn-arounds for maintenance purposes. Inherently, however, the swing-bed system possesses the disadvantage accompanying the sudden replacement of an entire zone of deactivated catalyst with freshly-regenerated catalyst, resulting in operational upsets with respect to steady, lined-out conditions, as well as product yields and quality.

Still more recently, a "stacked" reactor system has been provided wherein the catalyst particles flow, via gravity, downwardly from one annular-form catalyst zone into another. Ultimately, the catalyst is transferred to a suitable regeneration system, preferably also functioning with a downwardly moving bed of catalyst. In actual operation, the catalyst particles are maintained within the reactor system, and transferred from one section to another in such a manner that the flow of particles may be continuous, at frequent intervals or at extended intervals, with the movement being controlled by the quantity of catalyst withdrawn from the last of the series of individual zones.

Illustrative of a reaction system, wherein the reactant stream is caused to flow laterally and radially through the catalyst is that described in U.S. Pat. No. 2,683,654 (Cl. 23-288). The reaction chamber shown is intended for the common fixed-bed system wherein the catalyst is either subjected to in situ regeneration, or replaced. The reactant stream flows from an outer annular-form space, through a catalyst retaining screen and catalyst particles disposed in an annular space, and into a perforated center-pipe, through the bottom of which it emanates from the reaction chamber.

U.S. Pat. No. 3,470,090 (Cl. 208-138) illustrates a side-by-side, movable-bed reaction system with intermediate heating of the reactant stream. Catalyst withdrawn from a reaction zone is sent to suitable regeneration facilities, rather than to the next succeeding reaction zone.

A stacked reforming configuration is shown in U.S. Pat. No. 3,647,680 (Cl. 208-65) as a two-stage system having an integrated regeneration facility. These latter two techniques utilize a downwardly-moving bed of catalyst particles through which the reactant stream flows. Significant improvements are achieved, with these movable catalyst systems, especially with respect to optimum catalyst/reactant contacting conditions and the period of time during which the system functions mechanically in an economically acceptable fashion.

OBJECTS AND EMBODIMENTS

A principal object of our invention is to provide an improved ring-flanged slip-joint. A corollary objective is to provide a slip-joint for utilization in movably connecting a catalyst-retaining screen with a screen support member.

A specific object of the present invention is to prevent the migration of catalyst particles from an annular-form, catalyst-holding zone into other annular-form zones of the reactor system. Another objective involves the construction and the arrangement of a plurality of stacked, or side-by-side, annular-form reaction zones in a system wherein the catalyst particles are movable via gravity-flow.

Therefore, in a broad embodiment, our invention is directed toward a ring-flanged, slip-joint for utilization in movably connecting (i) a catalyst-retaining screen, vertically-disposed within a catalytic reaction chamber and distending substantially the entire length thereof, with (ii) a screen support member immovably connected to a lower portion of said reaction chamber, which slip-joint comprises, in combination: (a) an upper ring-flanged face immovably connected to said catalyst-retaining screen; (b) a lower ring-flanged face immovably connected to said screen support member and in slidable contact with said upper ring-flanged face; and, (c) a ribbon seal immovably connected to said upper flange, extending downwardly therefrom, and in contact with said lower flanged face. In a preferred embodiment, the ribbon seal is immovably connected to the inner peripheral edge of said upper flange.

A more specific embodiment of our invention resides in a catalytic reactor system providing contact of a reactant stream with catalyst particles movable through said system via gravity-flow, which system comprises, in combination: (a) an elongated, vertically-disposed reaction chamber containing (b) a tubular-form, catalyst-retaining screen, coaxially distended substantially the entire length of said chamber, having (i) a nominal internal cross-sectional area less than said chamber to provide a reactant annulus, and (ii) a first ring-flanged face immovably connected to the lower peripheral extremity of said catalyst-retaining screen; (c) a tubular-form, perforated centerpipe, coaxially distended substantially the entire length of said chamber, and having a nominal cross-sectional area less than said catalyst-retaining screen to provide an annular catalyst-holding zone; (d) a tubular-form, catalyst-retaining screen support member attached at its lower peripheral extremity to a bottom portion of said chamber, and having a second ring-flanged face immovably connected to its upper peripheral extremity, and in slidable contact with said first ring-flanged face; and, (e) a ribbon seal immovably connected to the inner peripheral edge of said first ring-flanged face, extending downwardly therefrom to contact said second ring-flanged face.

These, as well as other objects and embodiments will become evident from the following more detailed description of our invention.

SUMMARY OF INVENTION

As hereinbefore setforth, the apparatus encompassed by the present invention is suitable for utilization in a multitude of hydrocarbon conversion processes, and especially those which are effected in vapor phase. Although the foillowing discussion is primarily directed to the catalytic reforming of naphtha fractions, and/or distillates, there is no intent to so limit the present invention. Catalytic reforming, as well as the other processes previously setforth, has passed through several development phases which have currently terminated in a catalytic reactor system in which the catalyst particles are in the form of a descending column in one or more reaction vessels. Typically, the catalysts are employed in spherical form having a nominal diameter ranging from about one thirty-second-inch to about one-eighth-inch in order to afford free-flow characteristics which will not bridge, or block the descending column, or columns of catalyst within the overall system. In one such multiple-stage system, the reaction chambers are vertically stacked, and a plurality of relatively small diameter transfer conduits are employed to transfer catalyst particles from one reaction zone to another. In order to facilitate and enhance gravity flow of the particles from one zone to another, it is particularly important that the catalyst particles have a small diameter, and one which is preferably less than about one-eighth-inch.

With respect to the catalytic reforming of hydrocarbons, in a vapor phase operation, conditions include catalyst temperatures in the range of about 700°F. to about 1000°F.; cautious operating techniques generally dictate that catalyst temperatures not substantially exceed a level of about 1020°F. Other conditions include a pressure from about 50 psig. to about 1000 psig., a liquid hourly space velocity of about 0.2 to about 10.0 and a hydrogen to hydrocarbon mole ratio from about 1.0:1.0 to about 10.0:1.0. The present inventive concept is particularly adaptable to low-pressure operations — i.e. from about 50 psig. to about 200 psig. Since catalytic reforming reactions are principally endothermic in nature, the multiple-stage system will employ interstage heating of the effluent from a preceding zone, prior to the introduction thereof into the next succeeding zone. Catalytic reforming reactions are effected through the use of a Group VIII noble metal combined with a halogen component and a suitable porous carrier material; with respect to the latter, alumina is generally preferred. Recent investigations have indicated that more advantageous results are enjoyed through the co-joint use of a catalytic metallic modifier; these are generally selected from the group of rhenium, germanium, tin, titanium, vanadium and various mixtures thereof.

In annular-form reaction chambers, of the type hereinbefore described, the catalyst-retaining screen and perforated centerpipe are generally constructed of narrower gauge metallic material than is the outer shell, or reaction chamber. With respect to the catalyst-retaining screen especially, design considerations dictate the use of different metal alloys. For example, the catalyst-retaining screen is usually fabricated from a high alloy steel such as ASTM A-240, Type 321 or 347, in order to prevent corrosion of any delicate or critical sized parts thereof. In the case of a reaction system wherein the catalyst particles are movable via gravity-flow, the high alloy steel further prevents erosion of corrosion products from the screen, whereby the catalyst can become contaminated. The reaction chamber, heads, and catalyst-retaining screen support are not so delicate, and do not come in contact with the moving column of catalyst. Therefore, they are generally made of carbon steel or a low alloy steel such as ASTM A- 387-C. These different types of materials have varying expansion and extraction characteristics and, since such reaction chambers are frequently maintained at elevated temperatures, a considerable difference in the thermal expansion of the screen and the screen support exists. If the retaining screen is directly and immovably connected to the lower portion of the reaction chamber, the expansion and contraction thereof produces severe warping and stress with the result that permanent damage occurs. Such damage usually permits migration of the catalyst particles into the outer reactant annulus which generally results in high pressure drop and poor flow characteristics of the reactant stream through the annular catalyst-holding zone. These detrimental effects are even more pronounced in a system having a descending annular zone of catalyst particles. Poor flow distribution of the reactant stream produces coking of both the migrated catalyst and that disposed in the annular-form bed. With respect to the movable catalyst system, lumps of coke and catalyst can effectively block the catalyst transfer conduits and thus inhibit the downward movement of catalyst particles.

This particular problem is resolved by providing a catalyst-retaining screen support member immovably attached at its lower end to the reaction chamber, and movably connected at its upper end to the catalyst-retaining screen. The support member is generally of the same alloy steel as the reaction chamber, but different from the catalyst-retaining screen. This movable, slidable connection effectively takes up the effects of expansion and contraction, and thus prevents the deleterious stressing and damaging of the catalyst-retaining screen. The movable connection between the catalyst-retaining screen and its support member can be fabricated in many suitable ways. One particularly suitable method, from the standpoint of operability and fabrication, is to provide the catalyst-retaining screen with a ring-flanged connected at its lower peripheral extremity, while simultaneously providing the support member with a ring flange along its upper peripheral extremity. The faces of the ring flange are in slidable contact with each other. To permit lateral motion, to a degree short of complete disconnection of the flange faces, the same may be movably connected by means of a shoulder, or machine bolt.

While affording the solution to the screen stressing problem, the ring-flanged slip-joint gives rise to another. Machining of the screen flange and support ring, during fabrication, is undesirable since it is both difficult and expensive, particularly when the nominal diameters thereof are eight feet or more. The common rolling and forming techniques available to the fabricators produce a screen flange and support ring which are not sufficiently flat to preclude the leakage of catalyst therebetween. This is especially true when the catalyst size is about one thirty-second-inch to about one-sixteenth-inch. Additionally, forming and welding of the screen flange and support ring causes stresses to be induced. When these are heated during normal operation, warping will occur, thus creating additional passageways of a size capable of permitting leakage of catalyst through the joint and into the reactant annulus. The velocity of the reactant vapors in the outer reactant conduit is sufficient to churn these catalyst particles until they eventually become powdered and broken. As the quantity of "leaked" catalyst increases, the effect becomes compounded. Broken and powdered catalyst is actually carried upwards the entire length of the reactant annulus, due to the high vapor velocity, with the result that the screen openings become plugged. Powdered catalyst which is too fine to lodge in the screen openings passes into the catalyst bed, thereby producing excessive pressure drop. Obviously, this destroys the desired flow pattern, upsets the optimum operating pressure and eventually gives rise to a complete unit shut-down. In several instances when the unit was down for this reason, or any other, inspection of the catalyst-retaining screen indicated that the outside surface was plugged to the extent of from 10 to 70 percent.

Our invention provides a ring-flanged, slip-joint for utilzation in movably connecting the catalyst-containing screen with a screen support member which permits the screen to slide freely on the support ring and at the same time completely eliminates the leakage of catalyst from the catalyst bed into the reactant annulus behind the catalyst-retaining screen. Our effective method of preventing the catalyst leakage involves the use of a relatively thin ribbon seal — i.e. about 16 gauge — having a width of about one-fourth-inch to about three-fourths-inch. The ribbon seal is connected to the peripheral edge of the upper flange face, and projects downwardly to contact the lower flange face. Although the ribbon seal may be connected to the outer peripheral edge of the upper flange face, a particularly preferred arrangement constitutes connecting the same to the inner peripheral edge of the upper flange face. The ribbon seal is held flat against the inside edge of the screen flange, pushed downward until it contacts the support ring and is then welded to the screen flange. The band is flexible enough to be in 100% contact with the support ring, notwithstanding that the latter may be far from being perfectly flat. The ribbon seal is very flexible with respect to its 16-gauge dimension, and is easily held in contact with the screen flange even when the inside radius of the same is irregular. Since the ribbon seal is flexible, a continuous weld to the screen flange is not required. Under normal operation, an intermittent fillet weld approximately one-half-inch long on 4-inch centers is sufficiently adequate to hold the ribbon seal in place.

When thermal expansion causes the screen flange to move outward (or into the reactant annulus), the ribbon seal moves with it, while maintaining contact with the support ring. The weight of the catalyst assists in holding the ribbon seal against the inside edge of the screen flange. When thermal contraction causes the screen flange to move inward (into the catalyst-holding zone), the screen flange pushes the ribbon seal with sufficient force to sweep the catalyst without bending the ribbon seal. Shoulder, or machine bolts will normally be required to guide the screen, and further to act as a hold-down where any thermal or mechanical action would tend to lift the screen off the support ring. A slotted hole is required in the support ring to allow movement of the bolts freely with the screen flange. Washers, sized larger than the slot to prevent catalyst from entering the same regardless of the position of the bolt, are provided on the underside of the support ring. An alternate construction would have the slotted hole in the screen flange and the circular hole in the support ring, in which situation the washer would be located on the upper surface of the screen flange. When machine bolts are utilized, the nuts are finger-tight, and prevented from loosening either through the use of double nuts, or by way of tack-welding.

The forming and welding of the screen flange and support ring cause stresses to be induced. When heated during a normal unit start-up, these will often warp, thus opening catalyst leakage paths under the ribbon seal. To minimize this additional problem, the screen flange is stress-relieved after rolling, but prior to welding to the screen. As a final precaution, the ribbon seal is preferably welded to the screen flange after the reactor system has been heated during the drying-out phase of the start-up, and before the catalyst is loaded.

In further describing our invention, as employed in a process wherein a reactant stream contacts catalyst particles which are movable through the reactor system via gravity-flow, and the problem solved through the utilization thereof, reference will be made to the accompanying drawings. Briefly, these drawings are as follows.

For the purposes of this illustration, and the additional explanation thereof, it will be presumed that all the component parts are substantially circular in cross-sectional area.

DETAILED DESCRIPTION OF DRAWINGS

Figure 1:
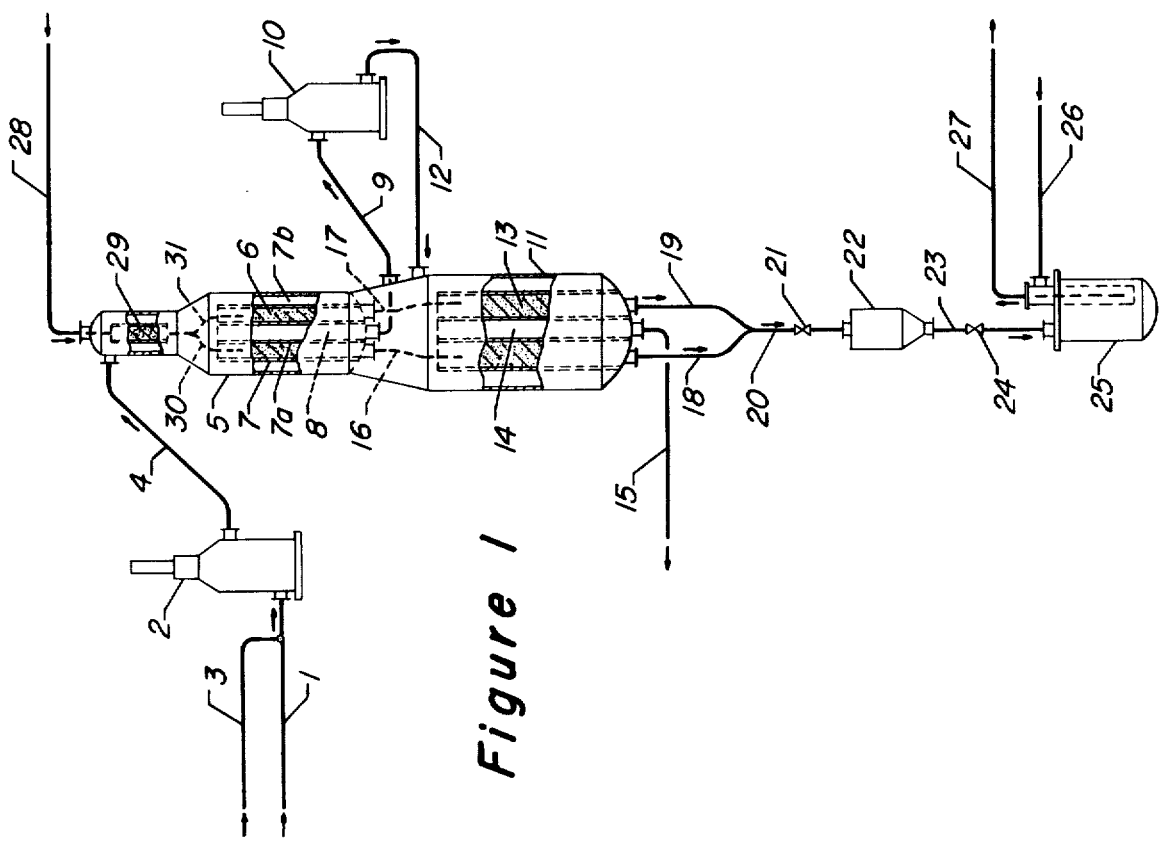
FIG. 1 is a diagrammatic, partially-sectioned elevational view of a stacked, two-stage reactor system having interheater 10 between stages.

With reference now to FIG. 1, a two-reactor, stacked system is shown. In effect, the system will have a common catalyst bed moving as a substantially unbroken column of particles from the top of reactor 5 therethrough, into and through reactor 11, being withdrawn therefrom and transported to suitable regeneration facilities (not illustrated), while regenerated catalyst is introduced into the top of reactor 5; thus, the catalyst will be regenerated with both reactor 5 and 11 remaining on-stream at reforming conditions.

In an illustrative operation, a straight-run naphtha fraction — i.e. 200°–400°F. distillation range — is introduced into the process by way of line 1, at a liquid hourly space velocity of about 2.0, and enters heater 2 in admixture with recycled hydrogen from line 3. The hydrogen to hydrocarbon mole ratio is about 3.0:1.0, the pressure is about 150 psig., and heater 2 increases the temperature of the reactant stream mixture to a level of about 950°F., the thus-heated mixture being discharged via line 4 into the upper portion of reactor 5. The reforming catalyst is in the form of one-sixteenth-inch spheres, and is a composite of alumina, 0.375% by weight of platinum, 0.375% by weight of tin, and about 0.9% by weight of combined chlorine.

The narrower upper portion of reactor 5 will be hereinafter described with reference to the incoming regenerated catalyst in line 28. Reactor 5 is shown as having the catalyst confined in an annular moving bed 6 which is formed by catalyst-retaining screen 7 and perforated centerpipe 7a. Similarly, retaining screen 7 forms an annular space 7b with the interior wall of reactor 5. The vaporous reactant stream flows laterally from annulus 7b through retaining screen 7 and radially through catalyst bed 6. The vapors exit catalyst bed 6 through perforated centerpipe 7a, and continue downwardly through cylindrical space 8. Since reforming reactions are principally endothermic in nature, the vapors leaving catalyst bed 6 will be at a temperature less than the inlet temperature of 950°F. They are, therefore, withdrawn through line 9 into heater 10, wherein the temperature is raised to 950°F. The heated stream is then introduced into reactor 11 via line 12.

Within reaction chamber 11, the reactant stream is passed in lateral, radial flow through annular catalyst bed 13 and downwardly through cylindrical space 14, to be withdrawn from the reaction chamber via line 15. The product effluent withdrawn from reactor chamber 11 is passed into conventional separation facilities for the recovery of a high-octane reformate — i.e. having an unleaded octane rating above about 95.— and the recovery of a hydrogen-rich gaseous phase which is recycled to the system through line 3.

The downwardly-moving catalyst particles in reactor 5 are introduced into annular bed 13 of reactor 11 by way of transfer conduits 16 and 17. These are but two of a plurality of catalyst transfer conduits, from about 6 to about 16, which provide uniformity of flow characteristics as the catalyst passes from reactor 5 into reactor 11. A minimal, but suitable pressure drop is maintained whereby substantially all the reactant vapors are directed through line 9, heater 10 and line 12, with an insignificant quantity by-passing heater 10. In effect, the reactor system has a common catalyst bed moving downwardly as a substantially unbroken column of particles.

Catalyst particles are removed from conduits 18 and 19 at a rate such that the total catalyst inventory within the system is replaced in approximately a 1-week to 4-week cycle. The catalyst removed from the multiple-transfer conduits, represented by conduits 18 and 19, is introduced via a common header 20, containing control valve 21, into lock-hopper 22 for separation therein of any residual hydrocarbons. The catalyst is subsequently transferred via line 23, containing control valve 24, to lift-engager 25. Nitrogen, or other suitable inert gas, from line 26, is employed to remove the used catalyst from lift-engager 25 through line 27. In a completely integrated system, the catalyst in line 27 is transferred to the top of suitable regeneration facilities.

Regenerated catalyst is returned to the system, in admixture with hydrogen, through line 28. Prior to direct contact with the reactant stream in upper reactor 5, the regenerated catalyst/hydrogen mixture is processed in a dense phase in reducing zone 29 to effect indirect heat-exchange with hot reactant vapors being charged to reactor 5. The catalyst is processed downwardly in reduction zone 29 at a rate to establish a residence time of about 2 hours at a temperature of about 950°F. to about 1000°F. The resulting reduced catalyst is thereafter added to catalyst bed 6 through transfer conduits 30 and 31, replacing that catalyst withdrawn from the system via conduits 18 and 19.

Figure 2:
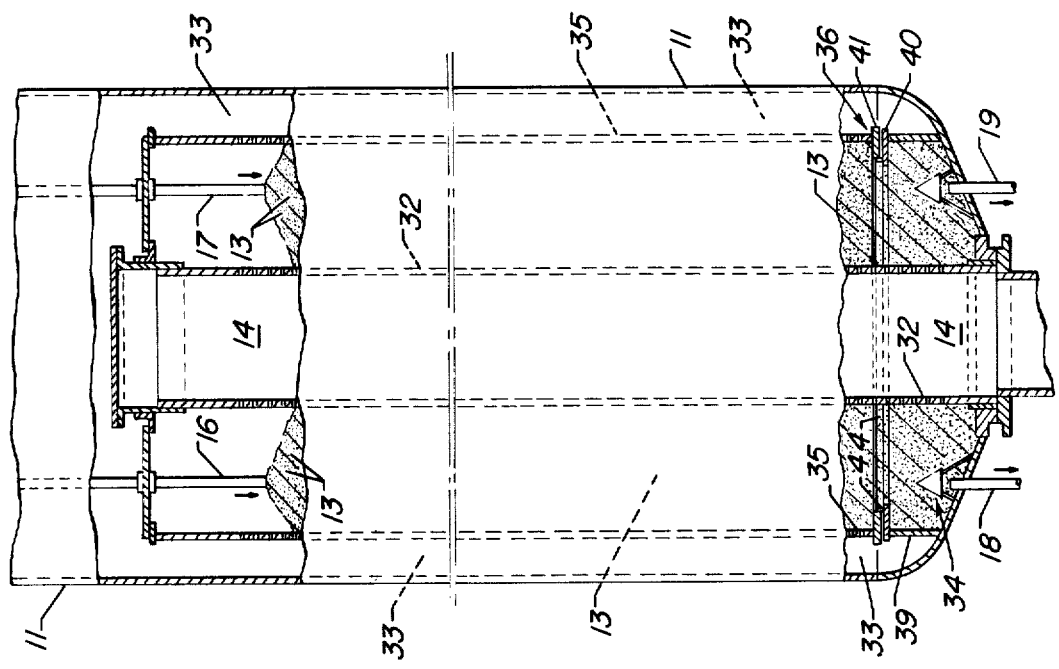
FIG. 2 is an enlarged sectional view of a portion of the second reaction stage indicated as 11 in FIG. 1.

FIG. 2 is an enlarged sectional view of a portion of reaction zone 11. The downwardly-moving catalyst particles are introduced into catalyst holding zone 13 by way of transfer conduits 16 and 17. Annular zone 13 is formed by perforated centerpipe 32 and catalyst-retaining screen 35. Similarly, retaining screen 35 forms a reactant annulus 33 with the interior wall of reactor 11. As hereinbefore stated, the reactant stream flows laterally through retaining screen 35, radially through the catalyst in zone 13, through perforated centerpipe 32 and into area 14 through which it is removed from the reaction zone. Catalyst-retaining screen 35 is supported by screen support member 39 which includes, in this view, the ring-flanged slip-joint. Uniformity of catalyst flow through catalyst transfer conduits, represented as 18 and 19, is enhanced by providing coolie-hats (including supports) 34 over each of the transfer conduits 18 and 19.

Figure 3:
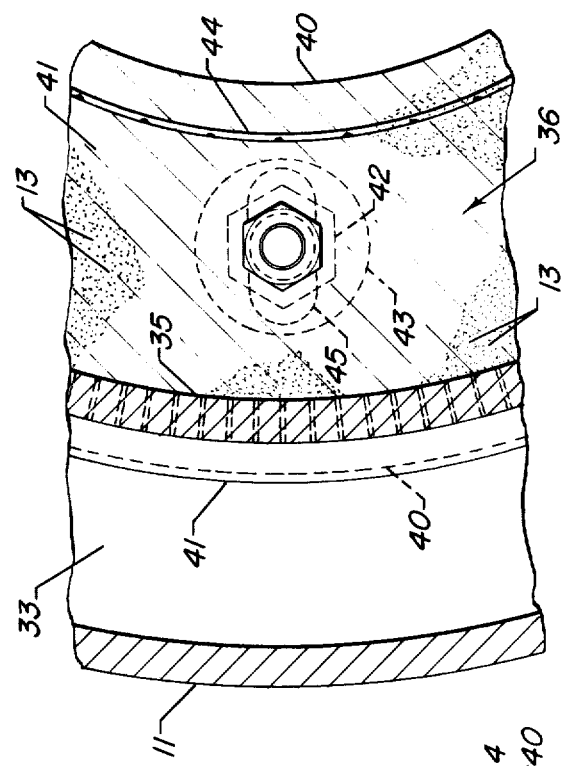
FIG. 3 is an enlarged sectional view of a portion of the bottom of the reaction system.

FIG. 3 is an enlarged sectional view of a portion of the bottom of reactor 11. Catalyst flows uniformly from annular space 13 through the support members for coolie-hats 34 into transfer conduits 18 and 19. Catalyst-retaining screen 35 is equipped at its lower end with ring-flange 41 which forms a slip-joint with ring-flange 40 of screen support member 39. In the illustration shown, the ring-flanges are movably connected by means of shoulder bolt 42. FIG. 3 also indicates washer 43 and ribbon seal 44, the latter being tack welded to ring flange 41 extending downwardly therefrom in contact with ring flange 40.

Figure 4:
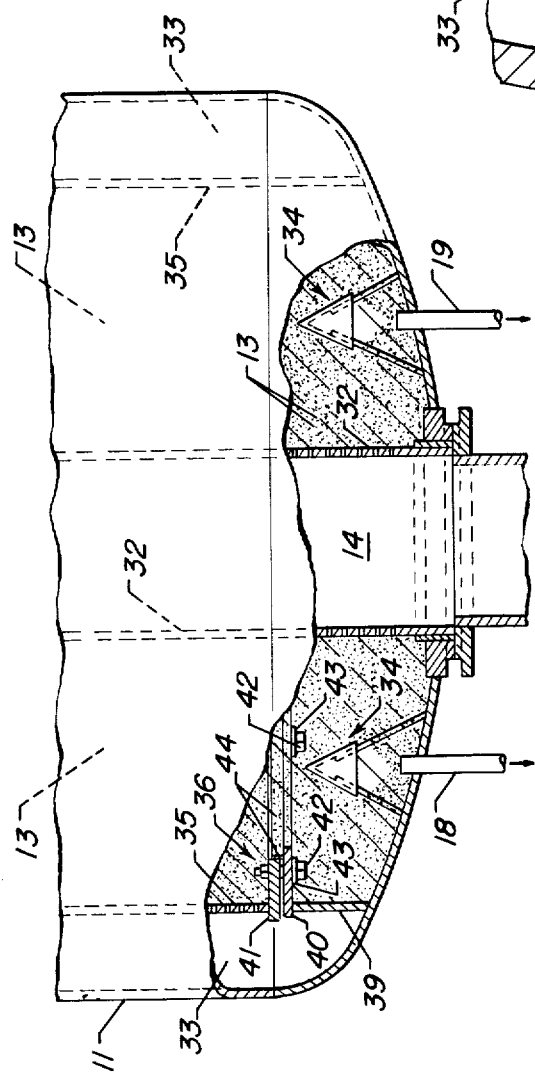
FIG. 4 is a sectioned detail of the ring-flanged slip-joint connection between the catalyst retaining screen 35 and the screen support member 39.

FIG. 4 is an enlarged detail of slip-joint 36, and illustrates the preferred embodiment wherein shoulder bolt 42 serves to movably connect ring flange 40 and 41. It should be noted that washer 43 has a considerably larger nominal diameter than slot 45 in ring flange 40 so that it completely covers slot 45 regardless of the position of bolt 42 within the slot. The sliding slip-joint is effectively sealed by way of tack-welded ribbon seal 44.

Figure 5:
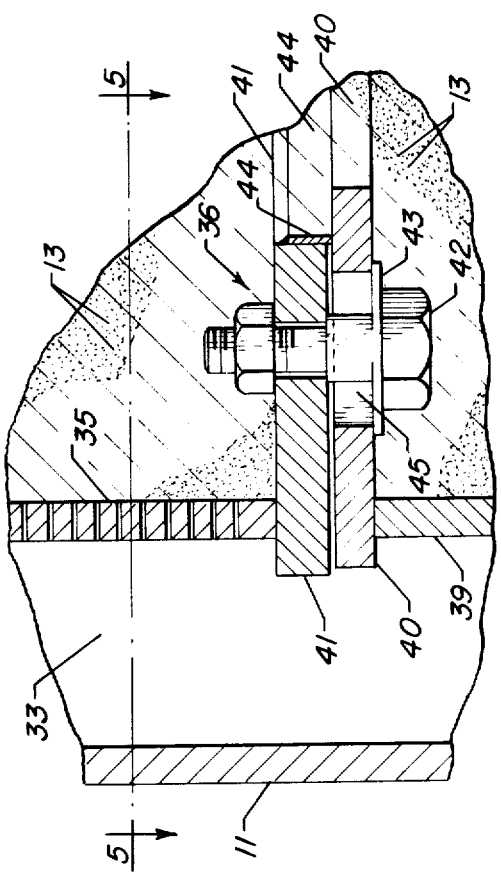
FIG. 5 is a partially sectioned view taken along the line 5—5 of FIG. 4.

FIG. 5 is a partial plan view taken along the line 5—5 of FIG. 4 and illustrates the relationship between washer 43 and slot 45, as well as the placement of ribbon seal 44 with respect to upper flange 41 and lower flange 40.

Through the utilization of the ribbon seal, the slip-joint is effectively sealed to prevent the migration of catalyst particles into the reactant annulus. This greatly reduces the degree of plugging of the catalyst-retaining screen and permits an extension of the period during which the reactor system functions efficiently.

We claim as our invention:

1. A catalytic reactor system providing contact of a reactant stream with catalyst particles movable through said system via gravity flow, which system comprises, in combination:
   a. an elongated, vertically-disposed reaction chamber containing;
   b. a tubular-form, catalyst-retaining screen, coaxially distended substantially the entire length of said chamber, having (i) a nominal internal cross-sectional area less than said chamber to provide a reactant annulus, and (ii) a first ring flange face immovably connected to the lower peripheral extremity of said catalyst-retaining screen;
   c. a tubular-form, perforated centerpipe, coaxially distended substantially the entire length of said chamber, and having a nominal cross-sectional area less than said catalyst-retaining screen to provide an annular catalyst-holding zone;
   d. a tubular-form, catalyst-retaining screen support member attached at its lower peripheral extremity to a bottom portion of said chamber, and having a second ring flange face immovably connected to its upper peripheral extremity and in slidable contact with said first ring-flange face; and,
   e. a flexible ribbon seal immovably connected to the inner peripheral edge of said first ring-flange face extending downwardly therefrom to contact said second ring-flange face.

2. The reactor system of claim 1 further characterized in that said reaction chamber, catalyst-retaining screend, screen support member and centerpipe are substantially circular.

3. The reactor system of claim 1 further characterized in that said first and second ring-flange faces are slidably connected by a shoulder, or machine bolt to form a slip-joint.

* * * * *